United States Patent
Fraser et al.

(10) Patent No.: US 9,892,159 B2
(45) Date of Patent: Feb. 13, 2018

(54) DISTANCE-BASED LOGICAL EXPLORATION IN A RELATIONAL DATABASE QUERY OPTIMIZER

(71) Applicant: Microsoft Corporation, Redmond, WA (US)

(72) Inventors: Campbell B. Fraser, Redmond, WA (US); Cesar Galindo-Legaria, Redmond, WA (US); Vasileios Papadimos, Seattle, WA (US); Andrew S. Richardson, Redmond, WA (US); Ciprian G. Clinciu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

(21) Appl. No.: 13/828,196

(22) Filed: Mar. 14, 2013

(65) Prior Publication Data

US 2014/0280035 A1     Sep. 18, 2014

(51) Int. Cl.
*G06F 7/00*      (2006.01)
*G06F 17/30*    (2006.01)

(52) U.S. Cl.
CPC ............... *G06F 17/30463* (2013.01)

(58) Field of Classification Search
CPC ......... G06F 17/30463; G06F 17/30516; G06F 17/30203; G06F 17/30474; G06Q 30/0283
USPC .......................... 707/706, 718, 719, 717, 720
See application file for complete search history.

(56) References Cited

U.S. PATENT DOCUMENTS

| | | |
|---|---|---|
| 7,359,922 B2 | 4/2008 | Young-Lai et al. |
| 2002/0103793 A1 | 8/2002 | Koller et al. |
| 2002/0116357 A1 | 8/2002 | Paulley |
| 2004/0236762 A1 | 11/2004 | Chaudhuri et al. |

(Continued)

OTHER PUBLICATIONS

Bruno, Nicolas, "Statistics on Query Expressions in Relational Database Management Systems", Retrieved at <<http://research.microsoft.com/pubs/74108/thesis.pdf>> In the proceedings of in Partial Fulfillment of the Requirements for the Degree of Doctor of Philosophy in the Graduate School of Arts and Sciences, Retrieved Date: Jan. 16, 2013, pp. 217.

(Continued)

*Primary Examiner* — Md. I Uddin
(74) *Attorney, Agent, or Firm* — Fiala & Weaver P.L.L.C.

(57) ABSTRACT

Systems and methods are described that generate an execution plan for a query in a relational database system. The systems and methods generate the execution plan by generating one or more initial logical representations of the query, performing an exploration process around each of the one or more initial logical representations of the query, the performing of the exploration process around a particular initial logical representation of the query comprising applying transformation rules to generate one or more additional logical representations of the query that are logically equivalent to the particular initial logical representation of the query and that are within a maximum allowable transformation distance of the particular initial logical representation of the query, generating one or more execution plans for each initial logical representation of the query and each additional logical representation of the query, and selecting an execution plan from among the generated execution plans.

19 Claims, 7 Drawing Sheets

(56) References Cited

U.S. PATENT DOCUMENTS

| | | | |
|---|---|---|---|
| 2008/0195578 A1* | 8/2008 | Hueske et al. ............... 707/2 |
| 2008/0249998 A1* | 10/2008 | Dettinger .......... G06F 17/30401 |
| 2009/0204551 A1* | 8/2009 | Wang et al. ................. 705/400 |
| 2011/0314000 A1* | 12/2011 | Chaudhuri ........ G06F 17/30463 |
| | | | 707/718 |
| 2012/0109936 A1 | 5/2012 | Zhang et al. |
| 2012/0203762 A1* | 8/2012 | Kakarlamudi .... G06F 17/30463 |
| | | | 707/718 |
| 2012/0317647 A1 | 12/2012 | Brumley et al. |
| 2013/0086039 A1* | 4/2013 | Salch ............... G06F 17/30463 |
| | | | 707/717 |

OTHER PUBLICATIONS

Graefe, Goetz, "The Cascades Framework for Query Optimization", IEEE Data Engineering Bulletin, vol. 18, No. 3, Sep. 1995, pp. 19-28.

Waas et al., "Counting Enumerating and Sampling of Execution Plans in a Cost-Based Query Optimizer", Proceedings of the 2000 ACM SIGMOD International Conference on Management of Data, vol. 29, Issue. 2, Jun. 2000, pp. 499-509.

Graefe et al., "The EXODUS Optimizer Generator", Proceedings of the ACM SIGMOD International Conference on Management of Data, May 1987, pp. 160-172.

Ioannidis et al., "Randomized Algorithms for Optimizing Large Join Queries", ACM, 1990, pp. 312-321.

Pellenkoft et al., "The Complexity of Transformation-Base Join Enumeration", Proceedings of the 23rd VLDB Conference, 1997, pp. 306-315.

* cited by examiner

DISTANCE-BASED LOGICAL EXPLORATION IN A RELATIONAL DATABASE QUERY OPTIMIZER

BACKGROUND

A relational database is a collection of data items organized as a set of formally described tables from which data can be easily accessed. A relational database system facilitates access to a relational database by receiving queries from users, applications or other entities, executing such queries against the relational database to produce a results dataset, and returning the results dataset to the entity that submitted the query. Some relational database systems include a query optimizer that operates to generate an execution plan for a query. The execution plan represents an efficient execution strategy for the query. For example, the execution plan may represent a strategy for executing the query in a manner that conserves time and/or system resources.

An important part of an execution plan is its logical structure. The logical structure of an execution plan specifies, for example, the order in which tables are accessed and the order in which relational join and group by operations are performed. It can be difficult for a query optimizer to select an optimal execution strategy at least in part because generating a complete set of available execution plans may be computationally infeasible. As the number of tables referenced by a query grows, the number of possible logical orderings grows extremely fast. In particular, if n represents the number of tables referenced, the number of logical orderings grows with the Catalan Number $f(n)=(2n)!/(n+1)!n!$. For n=10, this is approximately 17 thousand different logical orderings. For n=20, this is over 6.5 billion different logical orderings. Given that each logical ordering may have hundreds or thousands of possible physical implementation alternatives, it may not be possible to explore and evaluate the entire plan search space for even modest values of n and return an execution plan in a satisfactory time.

Obtaining efficient execution plans for queries with large search spaces is one of the basic problems faced by commercial query optimizers. It requires striking a delicate balance among many aspects: quality of the execution plan produced and compilation time; robustness, extensibility and maintainability of the code. The problem has become more significant over the years because the complexity of queries keeps increasing.

SUMMARY

A method for generating an execution plan for a query in a relational database system is described herein. In accordance with the method, one or more initial logical representations of the query are generated. An exploration process is then performed around each of the one or more initial logical representations of the query. The performing of the exploration process around a particular initial logical representation of the query includes applying transformation rules to generate one or more additional logical representations of the query that are logically equivalent to the particular initial logical representation of the query and that are within a maximum allowable transformation distance of the particular initial logical representation of the query. One or more execution plans are then generated for each initial logical representation of the query and each additional logical representation of the query. An execution plan is then selected from among the generated execution plans.

In an embodiment, generating the one or more initial logical representations of the query comprises applying one or more global heuristics to the query to generate the one or more initial logical representations of the query. In further accordance with such an embodiment, the one or more global heuristics may be selected or specified by a user of the relational database system.

In another embodiment, selecting the execution plan from among the generated execution plans includes associating a cost with each execution plan in the generated execution plans, and selecting an execution plan from among the generated execution plans that has a lowest cost associated therewith.

The method described above may further include obtaining the maximum allowable transformation distance from a user, deriving the maximum allowable transformation distance from other information provided by a user, or determining the maximum allowable transformation distance based on one or more factors associated with data in the relational database system or with computing devices used to implement the relational database system.

The method described above may also include performing the following steps in response to determining that a cost associated with the selected execution plan is not acceptable: increasing the maximum allowable transformation distance, and continuing the performance of the exploration process around each of the one or more initial logical representations of the query using the increased maximum allowable transformation distance to generate one or more further logical representations of the query.

The method described above may also include performing the following steps in response to determining that an area of a plan search space explored by performing the exploration process merits further exploration: increasing the maximum allowable transformation distance, and continuing the performance of the exploration process in the area of the plan search space using the increased maximum allowable transformation distance.

Another method for generating an execution plan for a query in a relational database system is described herein. In accordance with the method, one or more initial logical representations of the query are generated. Each initial logical representation of the query includes a plurality of operators. A bounded exploration process is then performed. The bounded exploration process includes: (a) adding the operators of the initial logical representations of the query to a data structure (such as, but not limited to a MEMO data structure); (b) identifying zero or more patterns of operators within the data structure that are eligible for the application of a transformation rule, a pattern of operators being eligible for the application of a transformation rule if (i) the pattern of operators matches a pattern associated with the transformation rule and (ii) a search distance associated with one or more of the operators in the pattern of operators is less than a maximum allowable search distance; (c) applying a transformation rule to each eligible pattern of operators identified in step (b) to generate a logically-equivalent pattern of operators within the data structure, thereby generating one or more additional logical representations of the query within the data structure; (d) assigning a search distance to each operator within each logically-equivalent pattern of operators generated during step (c), the assigned search distance being a function of a search distance of one or more operators within the eligible pattern of operators to which the logically-equivalent pattern of operators corresponds; and (e) repeatedly performing steps (b), (c) and (d) until no further patterns of operators that are eligible for the application of a transformation rule can be identified within the data structure. After the bounded exploration process is performed, one or more physical implementation alternatives are obtained for each of the logical representations of the query included in the data structure. One of the physical implementation alternatives is then selected as the execution plan.

In an embodiment, generating the one or more initial logical representations of the query includes applying one or more global heuristics to the query to generate the one or more initial logical representations of the query. In further accordance with such an embodiment, the one or more global heuristics may be selected or specified by a user of the relational database system.

In another embodiment, obtaining the one or more physical implementation alternatives for each of the logical representations of the query included in the data structure includes converting one or more logical operators in the data structure to physical operators.

In a further embodiment, selecting one of the physical implementation alternatives as the execution plan includes calculating a cost associated with each physical implementation alternative obtained for each of the logical representations of the query included in the data structure, and selecting a physical implementation alternative having the lowest cost associated therewith as the execution plan.

In yet another embodiment, step (b) further includes determining that a search distance associated with one or more operators in a pattern of operators is less than the maximum allowable search distance, the determining including determining a greatest search distance associated with an operator in the pattern of operators, and comparing the greatest search distance to the maximum allowable search distance.

In a still further embodiment, step (d) includes identifying a function to be used to assign a search distance to each operator within a particular logically-equivalent pattern of operators based on the transformation rule that was applied to generate the particular logically-equivalent pattern of operators.

The foregoing method may further include obtaining the maximum allowable search distance from a user, deriving the maximum allowable search distance from other information provided by a user, or determining the maximum allowable search distance based on one or more factors associated with data in the relational database system or with computing devices used to implement the relational database system.

The foregoing method may also include performing the following steps in response to determining that a cost associated with the physical implementation alternative that was selected as the execution plan is not acceptable: increasing the maximum allowable search distance, and performing step (e) to generate one or more further logical representations of the query within the data structure.

A system is also described herein. The system includes one or more processors and a storage medium that stores computer program logic that is executable by the one or more processors. The computer program logic includes first computer program logic, second computer program logic, third computer program logic and fourth computer program logic. The first computer program logic is programmed to cause the one or more processors to generate one or more initial logical representations of a query. The second computer program logic is programmed to cause the one or more processors to perform an exploration process around each of the one or more initial logical representations of the query, the performing of the exploration process around a particular initial logical representation of the query including applying transformation rules to generate one or more additional logical representations of the query that are logically equivalent to the particular initial logical representation of the query and that are within a maximum allowable transformation distance of the particular initial logical representation of the query. The third computer program logic is programmed to cause the one or more processors to generate one or more execution plans for each initial logical representation of the query and each additional logical representation of the query. The fourth computer program logic is programmed to cause the one or more processors to select an execution plan from among the generated execution plans.

In an embodiment, the first computer program logic is programmed to cause the one or more processors to generate the one or more initial logical representations of the query by applying one or more global heuristics to the query.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
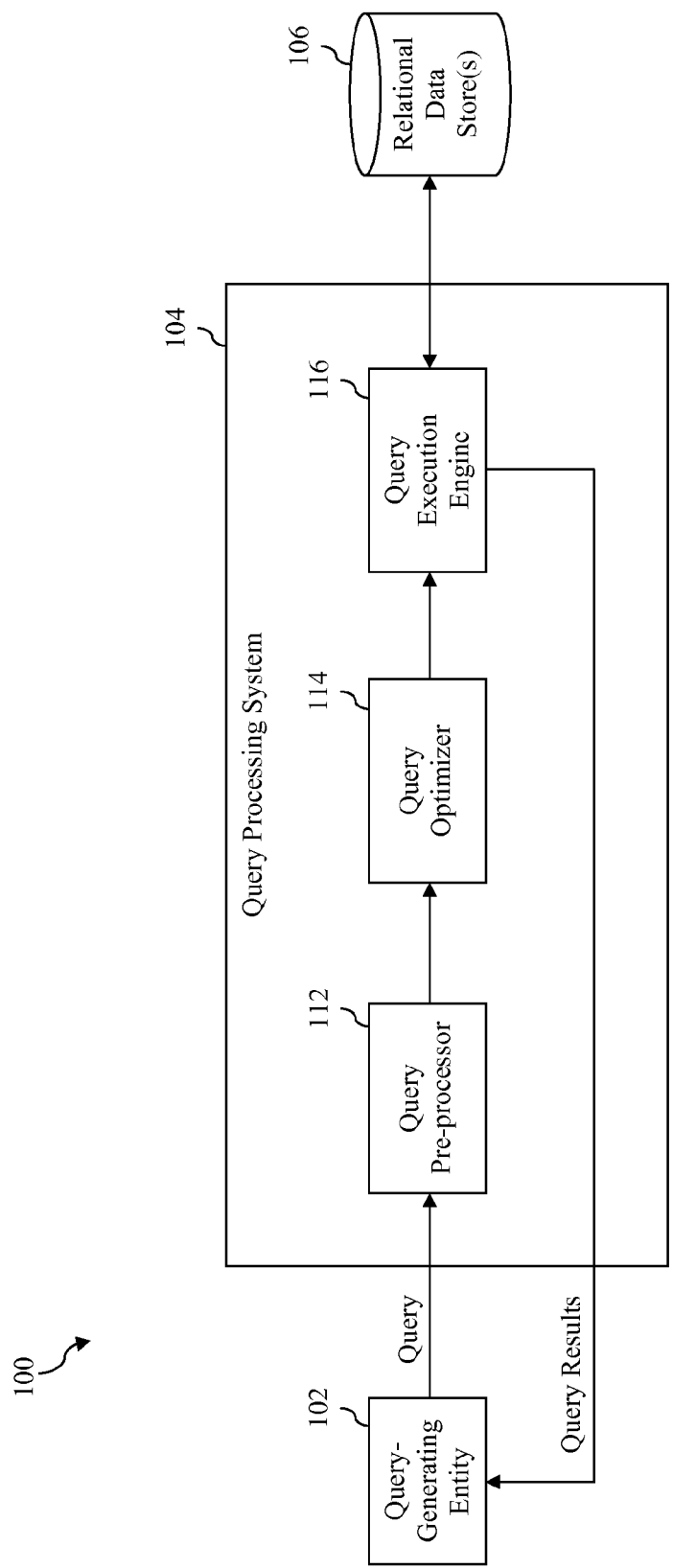
FIG. 1 is a block diagram of an example relational database system that includes a query optimizer that implements a distance-based logical exploration process for selecting a query execution plan in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Embodiments described herein are directed to systems and methods for generating an execution plan for a query in a relational database system. As discussed in the Background Section above, some relational database systems include a query optimizer that operates to generate an execution plan for a query. The execution plan represents an efficient execution strategy for the query. As also discussed in the Background Section above, it can be difficult for a query optimizer to select an optimal execution strategy at least in part because generating a complete set of available execution plans may be computationally infeasible. This is particularly true for queries that can be implemented using a large number of different execution plans having different logical structures.

To address this issue, some conventional query optimizers are designed to consider only those execution plans that exist within only a limited plan search space. Three basic approaches have typically been used to consider a limited plan search space: (1) rule-based optimization; (2) global heuristics; and (3) exhaustive exploration of constrained plan shapes. Each of these approaches will now be briefly described.

In so-called "rule-based optimization", an execution plan is generated based only on the query syntax and structural metadata, with no notion of cost. Some commercial query optimizers used this approach early on, but the plan quality is not considered competitive, and today rule-based optimization is virtually unused. Cost-based optimizers have become the industry standard.

Global heuristics are typically polynomial heuristics that consider some aspects of the query such as size of intermediate results. Query optimizers that use global heuristics typically analyze the query in its entirety and identify certain patterns. This approach has a few disadvantages: (a) by necessity only a few patterns can be considered and if all efficient execution plans fall outside of the pattern then the heuristic may not be effective; (b) the code needs to incorporate validity checks as it applies global changes, which is more difficult and error-prone than checking validity in a step-by-step fashion; and (c) these heuristics generate only one or a few alternatives and it is too complex to incorporate all the factors that contribute to execution cost.

Exhaustive exploration of constrained plan shapes is effective in terms of code robustness, correctness and quality of results, but it is unfeasible for queries that exceed a certain size. Some restrictions can be applied such as consideration of only linear execution trees, or no reordering across query blocks. It is known that these constraints exclude some efficient execution plans. These restrictions usually increase the size of queries that can be handled, but remain exponential and therefore fundamentally limited.

Some conventional query optimizers utilize both global heuristics and exhaustive exploration, often exposing an interface by which a database administrator or other user can select the desired approach. At least one conventional query optimizer has an automatic timeout mechanism that starts with global heuristics and then moves on to exhaustive exploration if the execution plan found earlier is considered too expensive.

In certain query optimizer implementations, the process of exploring the plan search space begins with a logical representation of the query. For example, the logical representation of the query may comprise a logical operator tree. An initial logical operator tree is typically obtained by translating the original query text into a tree structure with leaf nodes representing table accesses and internal nodes representing relational operators such as relational join. Exploration of the plan search space proceeds by applying transformation rules to the initial logical operator tree and subsequently-generated logical operator trees. A transformation rule acts on a subset of a logical operator tree, taking a source pattern and creating a logically-equivalent result pattern that is interchangeable with the source pattern at the same location. A comprehensive set of such transformation rules applied exhaustively will generate all possible logical execution strategies.

A query optimizer in accordance with an embodiment operates to select an execution plan for a query by first applying global heuristics to the query to generate one or more initial logical representations of the query. A bounded exploration process is then performed around each of the one or more initial logical representations of the query. Performing the bounded exploration process around a particular initial logical representation of the query comprises applying transformation rules to generate one or more additional logical representations of the query that are logically equivalent to the particular initial logical representation of the query and that are within a certain maximum allowable transformation distance of the particular initial logical representation of the query. Bounding the transformation distance from the initial logical representation(s) of the query in this manner prevents exhaustive exploration.

In accordance with certain embodiments, increasing bounds may be used on transformation distance as a mechanism to stage the exploration process so that it can proceed until an execution plan that is deemed acceptable is reached. Furthermore, an increasing bound on transformation distance may be selectively applied only to areas of the plan search space that are found to provide efficient execution strategies.

For the sake of convenience, the foregoing approach to generating a query execution plan will be referred to herein as "distance-based logical exploration". Distance-based logical exploration combines the benefits of global heuristics with those of exhaustive exploration. Global heuristics provide one or more starting points for search, and then neighborhoods of those points are explored based on local transformations. Local transformations may be fully composable and may be capable of handling any type of reordering. Global heuristics may be kept relatively simple, since final tuning can be achieved through finer-grain transformations.

By increasing the transformation distance allowed, distance-based logical exploration can be used to explore the same plan search space that would be considered by an exhaustive search. However, in many implementations, only a partial search will be performed.

Distance-based logical exploration advantageously allows easy incorporation of new global heuristics for obtaining the starting points for the bounded search process. Such new global heuristics may be useful in finding efficient execution plans faster for the target query patterns.

Distance-based logical exploration represents a significant improvement over approaches implemented by conventional query optimizers. For example, a query optimizer that implements distance-based logical exploration can now consider the bushy join space systematically, which is known to be better than the linear space. No conventional query optimizer does this in practice due to the plan search space explosion.

Section II, below, describes an example relational database system in which a query optimizer that utilizes distance-based logical exploration may be implemented. Section III provides a detailed explanation of how distance-based logical exploration may be implemented by a query optimizer and describes various alternative methods for implementing the technique. Section IV describes an example processor-based computer system that may be used to implement certain features described herein. Section V provides some concluding remarks.

II. Example Relational Database System

FIG. 1 is a block diagram of an example relational database system 100 that includes a query optimizer that utilizes a distance-based logical exploration technique for generating a query execution plan. It is noted that relational database system 100 is described herein merely by way of example only. Persons skilled in the relevant art(s) will readily appreciate that the distance-based logical exploration technique described herein may be implemented in a wide variety of systems other than relational database system 100 of FIG. 1.

As shown in FIG. 1, relational database system 100 includes a query-generating entity 102, a query processing system 104, and one or more relational data stores 106. Query-generating entity 102 may comprise a device, a computer program, or some other hardware-based or software-based entity that is capable of generating a query to be applied to a relational database. In one embodiment, query-generating entity 102 provides a user interface by which a user thereof can submit the query. In another embodiment, query-generating entity 102 is capable of automatically generating the query. Still other techniques for generating the query may be implemented by query-generating entity 102. The query generated by query-generating entity 102 may be represented using Structured Query Language (SQL) or any other database query language, depending upon the implementation.

Query-generating entity 102 is communicatively connected to query processing system 104 and is operable to submit the query thereto. In one embodiment, query processing system 104 comprises a software-implemented system executing on one or more computers. Generally speaking, query processing system 104 is configured to receive the query from query-generating entity 102, to execute the query against relational data store(s) 106 to obtain data responsive to the query, and to return such data as query results to query-generating entity 102. In one embodiment, query processing system 104 comprises a version of SQL SERVER®, published by Microsoft Corporation of Redmond, Wash. However, this example is not intended to be limiting.

As further shown in FIG. 1, query processing system 104 includes a query pre-processor 112, a query optimizer 114 and a query execution engine 116. Query pre-processor 112 is configured to receive the query submitted by query-generating entity 102 and to perform certain operations thereon to generate a representation of the query that is suitable for further processing by query optimizer 114. Such operations may include but are not limited to one or more of query normalization, query binding, and query validation. In an embodiment, query pre-processor 112 outputs a logical representation of the query. In further accordance with such an embodiment, the logical representation of the query may comprise a logical operator tree. As previously noted, a logical operator tree may be obtained by translating the original query text into a tree structure with leaf nodes representing table accesses and internal nodes representing relational operators such as relational join.

Query optimizer 114 is configured to receive the representation of the query output by query pre-processor 112 and to process such representation to generate an execution plan for the query. Generally speaking, query optimizer 114 operates to generate an execution plan for the query by performing a distance-based logical exploration of an execution plan space. In an embodiment in which a logical representation of the query (e.g., a logical operator tree or other logical representation of the query) is received by query optimizer 114, this process comprises first applying global heuristics to the query to generate one or more initial logical representations of the query. Then, a bounded exploration process is performed around each of the one or more initial logical representations of the query. Performing the bounded exploration process around a particular initial logical representation of the query comprises applying transformation rules to generate one or more additional logical representations of the query that are logically equivalent to the particular initial logical representation of the query and that are within a certain maximum allowable transformation distance of the particular initial logical representation of the query. Further details concerning the distance-based logical exploration process will be provided in the following section.

Once query optimizer 114 has generated an execution plan for the query, query optimizer 114 provides the execution plan to query execution engine 116. Query execution engine 116 is configured to carry out the execution plan by performing certain physical operations specified by the execution plan against relational data store(s) 106. The performance of such operations results in obtaining one or more datasets from the relational data store(s) 106. Query execution engine 116 may also be configured to perform certain post-processing operations on the dataset(s) obtained from relational data store(s) 106. For example, such post-processing functions may include but are not limited to combination operations (e.g., joins or unions), dataset manipulation operations (e.g. orderby operations, groupby operations, filters, or the like), or calculation operations. Once query execution engine 116 has obtained a dataset that satisfies the query, query execution engine 116 returns such dataset as query results to query-generating entity 102.

As noted above, query processing system 104 may be implemented on one or more computers. For example, query pre-processor 112, query optimizer 114 and query execution engine 116, or some sub-combination thereof, may be implemented on the same computer. Alternatively, each of query pre-processor 112, query optimizer 114 and query execution engine 116 may be implemented on different computers. Still further, each of query pre-processor 112, query optimizer 114 and query execution engine 116 may be implemented using multiple computers. For example, a distributed computing approach may be used to enable the functions of query optimizer 114 and/or query execution engine 116 to be performed in parallel by multiple computers. Still other implementations may be used.

In one embodiment, query-generating entity 102 and some or all of the components of query processing system 104 are executed on the same computer. In accordance with such an embodiment, the query generated by query-generating entity 102 may be provided to query processing system 104 via a communication channel that is internal to the computer.

In an alternate embodiment, query-generating entity 102 is implemented on a device that is separate from the computer(s) used to implement query processing system 104. In accordance with such an embodiment, communication between query-generating entity 102 and query processing system 104 may be carried out over a communication network. Such a communication network may include a local area network, a wide area network, direct connections, or a combination thereof. In one embodiment, the communications network includes the Internet, which is a network of networks. The communications network may include wired communication mechanisms, wireless communication mechanisms, or a combination thereof. Communications over such a communications network may be carried out using any of a variety of well-known wired or wireless communication protocols.

III. Distance-Based Logical Exploration

Figure 2:
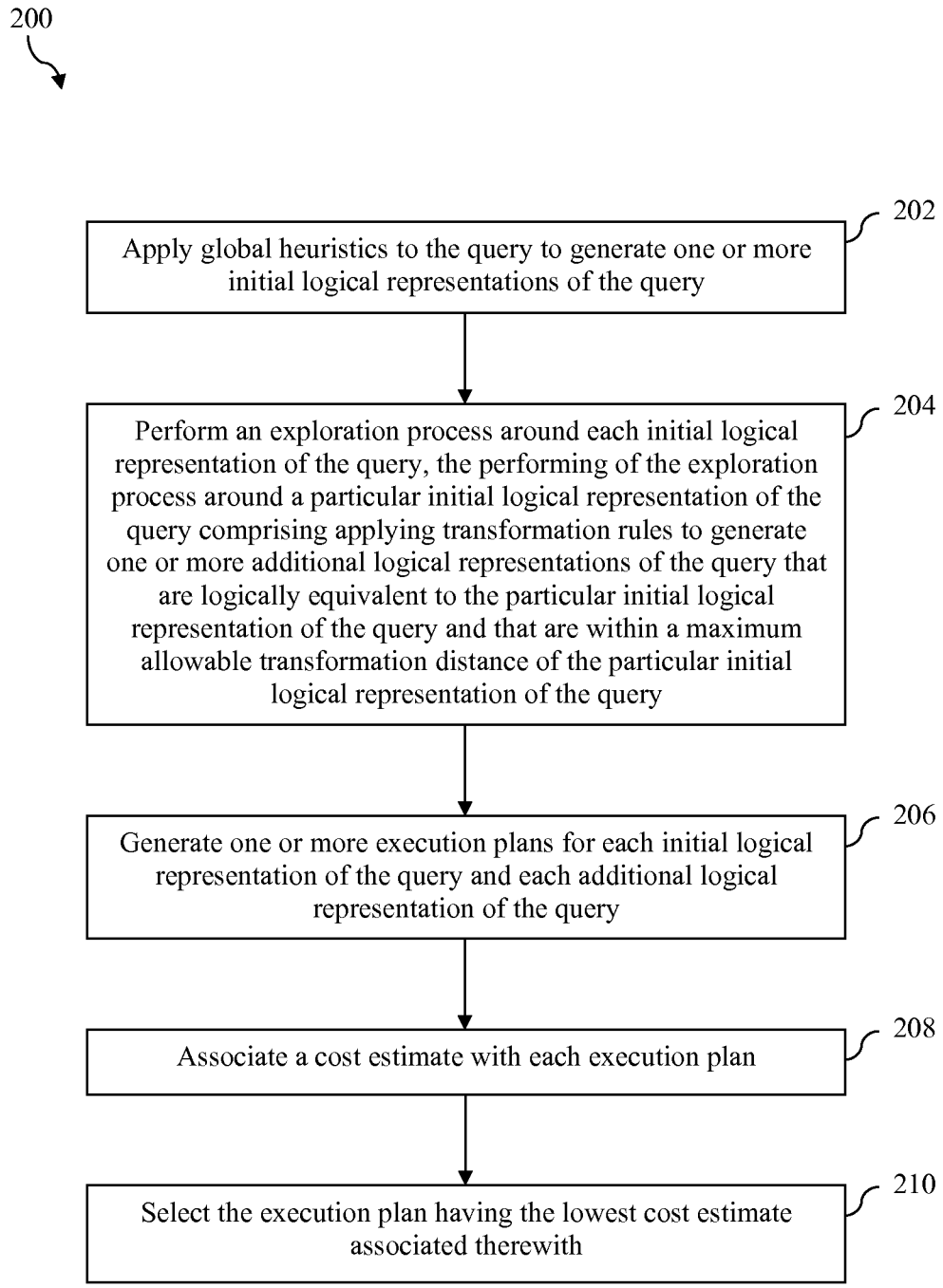
FIG. 2 depicts a flowchart of a method for generating an execution plan for a query in accordance with an embodiment.

FIG. 2 depicts a flowchart 200 of an example method for generating an execution plan for a query in a relational database system. The method of flowchart 200 may be implemented, for example, by query optimizer 114 of FIG. 1. However, the method is not limited to that embodiment and may be implemented by other query optimizers or relational database systems.

As shown in FIG. 2, the method of flowchart 200 begins at step 202, in which global heuristics are applied to the query to generate one or more initial logical representations of the query. Applying global heuristics to the query may comprise analyzing the query in its entirety to identify certain patterns, and then generating one or more initial logical representations of the query based on the identified patterns. In accordance with certain embodiments, the one or more initial logical representations of the query comprise one or more logical operator trees. However, this example is not intended to be limiting, and logical representations of the query other than logical operator trees may be used. For example, the logical representations of the query may comprise both logical and physical operators (or generally, operators). As another example, instead of trees other models such as directed acyclic graphs (DAGs) may be used to represent the relationships between operators.

In certain embodiments, the global heuristics applied during step 202 may be selected or specified by a user of the relational database system. For example, a database administrator may select or specify the global heuristics. A user interface, a configuration file, or some other means may be used to perform this function. Such functionality could advantageously be used to incorporate new global heuristics that are discovered to be useful for seeding the plan search space.

At step 204, an exploration process is performed around each initial logical representation of the query generated during step 202. The performing of the exploration process around a particular initial logical representation of the query comprises applying transformation rules to generate one or more additional logical representations of the query that are logically equivalent to the particular initial logical representation of the query and that are within a maximum allowable transformation distance of the particular initial logical representation of the query.

At step 206, one or more execution plans are generated for each initial logical representation of the query generated during step 202 and each additional logical representation of the query generated during step 204. In an embodiment, generating one or more execution plans for each logical representation of the query comprises generating one or more physical implementation alternatives corresponding to each logical representation of the query. In an embodiment in which each logical representation of the query is a logical operator tree, generating the one or more physical implementation alternatives corresponding to each logical representation of the query may comprise converting logical operators within the logical operator trees to physical operators.

At step 208, a cost estimate is associated with each execution plan generated during step 206. The cost estimate associated with each execution plan may be an estimate of the time required to process the query using the execution plan, an estimate of an amount of system resources (e.g., processing cycles, communication bandwidth, memory, or the like) that will be consumed when processing the query using the execution plan, an estimate of some other aspect associated with processing the query using the execution plan, or some combination thereof. Persons skilled in the relevant art(s) will readily appreciate that a wide variety of cost functions may be used to generate the cost estimate associated with each execution plan. Such cost functions may take into account different desired goals, including but not limited to reduced query processing time and/or reduced system resource utilization.

At step 210, the execution plan having the lowest cost associated therewith is selected as the execution plan to be output by the query optimizer.

Figure 3:
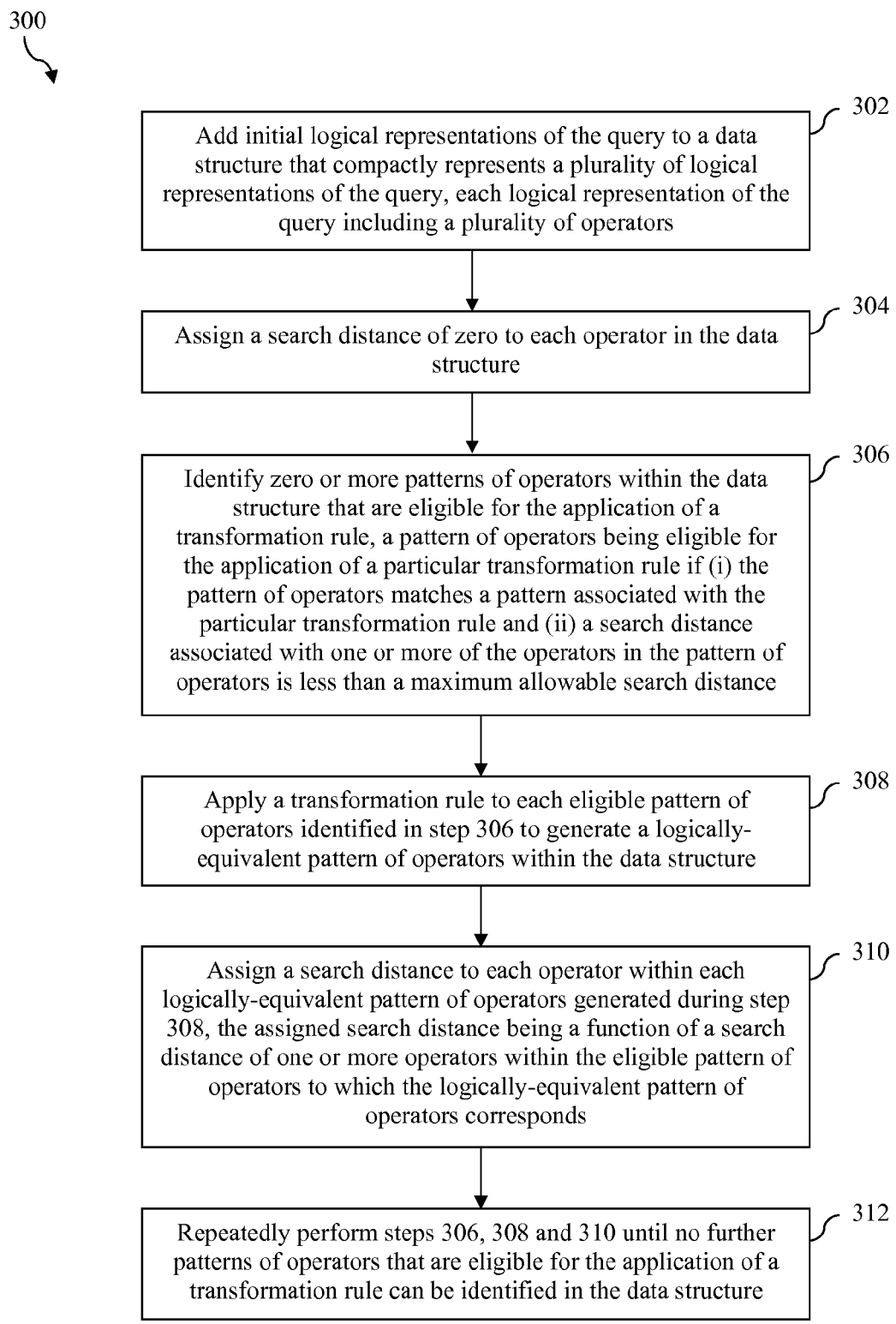
FIG. 3 depicts a flowchart of a method for performing a bounded exploration process around each of one or more initial logical representations of a query in accordance with an embodiment.

FIG. 3 depicts a flowchart 300 of one manner of implementing step 204 of flowchart 200 in an embodiment in which operators are used to logically represent a query. The method of flowchart 300 may be implemented by query optimizer 114 of FIG. 1. However, the method is not limited to that embodiment and may be implemented by other query optimizers or relational database systems. Also, although in certain examples discussed below the logical representations of the query are referred to as logical operator trees, it is to be understood that the method of flowchart 300 applies to any implementation in which operators of any type (e.g., logical and physical operators, or other types of operators) are used to logically represent a query. Also, the method of flowchart 300 applies to implementations in which models other than trees are used to represent relationships between operators. For example, the method applies to implementations in which directed acyclic graphs (DAGs) are used to represent relationships between operators.

As shown in FIG. 3, the method of flowchart 300 begins at step 302. During step 302, each initial logical representation of the query generated during step 202 is added to a data structure that compactly represents a plurality of logical representations of the query, wherein each logical representation of the query includes a plurality of operators. In one embodiment, the data structure comprises a MEMO data structure as described in F. Waas and C. Galindo-Legaria, "Counting, Enumerating, and Sampling of Execution Plans in a Cost-Based Query Optimizer," Proc. of the 2000 ACM SIGMOD Intl. Conf. on Management of Data, pp. 409-509, ACM (2000), the entirety of which is incorporated by reference herein. For the purposes of the following description of the method of flowchart 300, it will be assumed that the data structure referred to in the flowchart is a MEMO data structure. However, it is to be understood that other data structures may be used to practice the method.

An example will now be provided to help demonstrate this process. Assume the original received query is the following SQL query:

```
select *
from A   join B on A.x = B.x
         join C on A.x = C.x
         join D on A.x = D.x
where D.y < 5
```

In step 302, a first initial logical operator tree representation of the query may be added to a MEMO data structure, which is shown in Table 1, below.

TABLE 1

| Group | Expressions |
|---|---|
| G0 | 0: Join(G1, G3) |
| G1 | 0: Select(G2) |
| G2 | 0: Get(D) |
| G3 | 0: Join(G4, G5) |
| G4 | 0: Get(C) |
| G5 | 0: Join(G6, G7) |
| G6 | 0: Get(B) |
| G7 | 0: Get(A) |

In the MEMO data structure, the query is represented as a plurality of expressions that are assigned to different groups. An expression consists of an operator, and zero or more input groups. Group G0 is the root group, which will eventually contain all expressions that are found to be equivalent to the whole query. The first expression in group G0, which may be denoted G0.0, represents a Join between any expression from group G1 with any expression from group G3. In addition to Join (the set of all pairs from the two inputs that satisfy a condition, such as A.x=B.x), expressions in this MEMO data structure use two other operators: Select (the subset of input rows that satisfies a condition, such as z<5), and Get (the set of all rows in a given table). For simplicity, the groups, expressions, and operators representing the conditions for Joins and Selects are not shown in the MEMO data structure.

Figure 4:
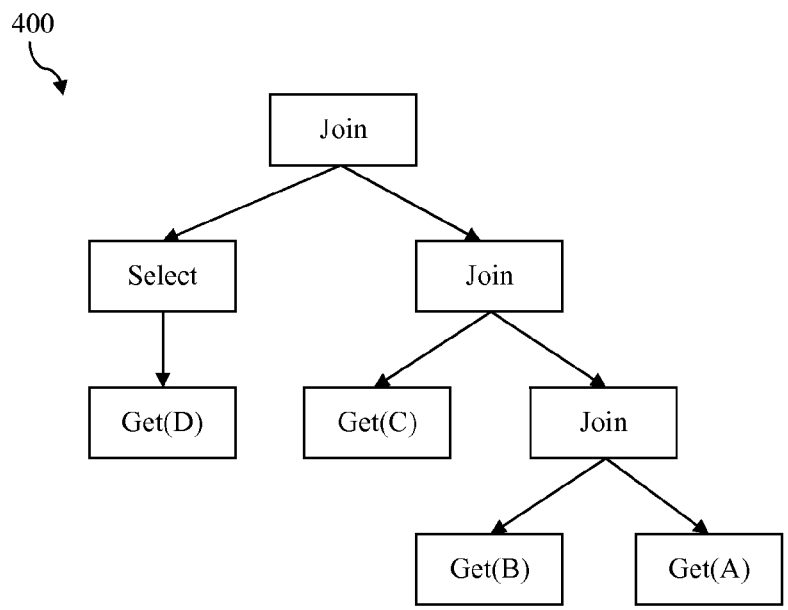
FIG. 4 illustrates a first example logical operator tree that may be used as a starting point for a distance-based logical exploration process for selecting a query execution plan in accordance with an embodiment.

The first logical operator tree loaded into the MEMO data structure represents a "deep" join tree in which every Join has a child mentioning a single table. A visual representation of this "deep" join tree is shown as tree 400 in FIG. 4. The number of equivalent trees for a query joining N tables grows exponentially with N, and considering all possible trees is infeasible for large values of N. Many conventional query optimizers limit themselves to considering only execution plans with deep tree shapes such as the one shown in FIG. 4. However, for some queries, the optimal execution plan may have a "bushy" (i.e., non-deep) shape, such as tree 500 of FIG. 5. Tree 500 of FIG. 5 is logically equivalent to tree 400 shown in FIG. 4.

Figure 5:
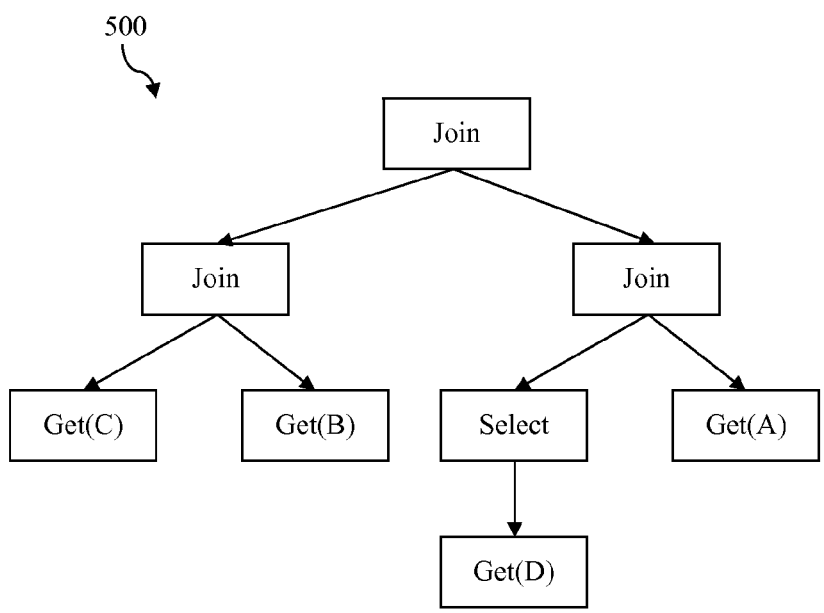
FIG. 5 illustrates a second example logical operator tree that may also be used as a starting point for a distance-based logical exploration process for selecting a query execution plan in accordance with an embodiment.

In further accordance with this example implementation of step 302, the second logical operator tree corresponding to tree 500 of FIG. 5 is also loaded into the MEMO data structure, resulting in the MEMO data structure shown in Table 2 below.

TABLE 2

| Group | Expressions |
|---|---|
| G0 | 0: Join(G1, G3), 1: Join(G8, G9) |
| G1 | 0: Select(G2) |
| G2 | 0: Get(D) |
| G3 | 0: Join(G4, G5) |
| G4 | 0: Get(C) |
| G5 | 0: Join(G6, G7) |
| G6 | 0: Get(B) |
| G7 | 0: Get(A) |
| G8 | 0: Join(G4, G6) |
| G9 | 0: Join(G1, G7) |

As shown in Table 2, a new expression G0.1 has been added to group G0 and new groups G8 and G9 have been added to the MEMO data structure. Expression G0.1, which represents a join between any expression from group G8 and any expression from group G9, is logically equivalent to expression G0.0.

After the initial logical operator trees have been added to the MEMO data structure in step 302, a search distance of 0 is assigned to each operator in the MEMO data structure in accordance with step 304. With continued reference to the example MEMO structure shown in Table 2, assigning a search distance of 0 to each operator in the MEMO data structure results in the MEMO structure shown in Table 3 below.

TABLE 3

| Group | Expressions |
|---|---|
| G0 | 0: Join(G1, G3)→0, 1: Join(G8, G9)→0 |
| G1 | 0: Select(G2)→0 |
| G2 | 0: Get(D)→0 |
| G3 | 0: Join(G4, G5)→0 |
| G4 | 0: Get(C)→0 |
| G5 | 0: Join(G6, G7)→0 |
| G6 | 0: Get(B)→0 |
| G7 | 0: Get(A)→0 |
| G8 | 0: Join(G4, G6)→0 |
| G9 | 0: Join(G1, G7)→0 |

After step 304, exploration is carried out starting with the initial logical representation(s) of the query that have been added to the MEMO structure. In particular, at step 306, zero or more patterns of operators within the MEMO data structure are identified as being eligible for the application of a transformation rule. A transformation rule is an expression of logical equivalence that can be applied to a first pattern of operators in the MEMO data structure to generate a logically-equivalent second pattern of operators. In accordance with step 306, a pattern of operators is eligible for the application of a particular transformation rule if (i) the pattern of operators matches a pattern associated with the particular transformation rule and (ii) a search distance associated with one or more of the operators in the pattern of operators is less than a maximum allowable search distance. The latter criterion that looks at search distance is the criterion that ensures that the exploration process is bounded rather than exhaustive.

At step 308, a transformation rule is applied to each eligible pattern of operators that was identified in step 306, thereby generating a logically-equivalent pattern of operators that is also stored within the MEMO structure.

At step 310, a search distance is assigned to each operator within each logically-equivalent pattern of operators generated during step 308. The assigned search distance is a function of a search distance of one or more operators within the eligible pattern of operators to which the logically-equivalent pattern of operators corresponds.

One example of how steps 306, 308 and 310 may be performed will now be provided with continued reference to the example MEMO structure of Table 3. For the purposes of this example, the relevant transformation rule is one that states that Join is commutative. That is, for arbitrary expressions X and Y, Join(X,Y) is equivalent to Join(Y,X). Also, for the purposes of this example, it is to be assumed that the maximum allowable search distance for exploration is 5.

Assuming the foregoing, during step 306, the pattern of operators represented by expression G0.0 will be identified as eligible for application of the transformation rule that states that Join is commutative. This is because (i) the pattern of operators represented by expression G0.0—namely, Join(G1,G3)—matches the pattern Join(X,Y) that is associated with the transformation rule, and (ii) because all of the operators in the pattern of operators represented by expression G0.0 have a search distance associated therewith that is less than the maximum allowable search distance of 5.

In step 308, the transformation rule that states that Join is commutative is applied to expression G0.0 to generate a logically-equivalent pattern of operators within the MEMO structure. This is shown in Table 4 below.

In particular, as shown in Table 4, the pattern of operators represented by expression G0.2, which is logically equivalent to expression G0.0, has been added to group G0 of the MEMO structure.

In further accordance with this example, during step 310, a search distance is assigned to the operator in newly-added expression G0.2. In this case, the search distance to be assigned is determined in accordance with a function f(x), where x is the search distance currently assigned to the operator of expression G0.0 (i.e., 0), and where f(x)=x+1. In this case, application of function f(x) results in a search distance of 1 being assigned to the operator in expression G0.2, which is also shown above in Table 4. As will be discussed below, different functions f(x) may be used during step 310 and, furthermore, different transformation rules may have different functions f(x) associated therewith.

After step 310, processing flows to step 312. During step 312, steps 306, 308 and 310 are performed repeatedly until no further patterns of operators that are eligible for the application of a transformation rule can be identified in the MEMO structure. When this point is reached, logical exploration of the plan search space is complete.

During the repeated performance of steps 306, 308 and 310, transformation rules may be applied to patterns of operators to generate new patterns of operators that may also be eligible for the application of transformation rules. This point will now be illustrated with continued reference to the example MEMO structure of Table 4.

For the purposes of this example, the relevant transformation rule is one that states that Join is associative. That is, for any arbitrary expressions X, Y and Z, Join(Join(X,Y), Z) is equivalent to Join(X, Join(Y,Z)). Again, it is to be assumed that the maximum allowable search distance is 5.

Assuming the foregoing, during step 306, the pattern of operators represented by expressions G0.2, G3.0, G4.0, G5.0 and G1.0 will be identified as eligible for application of the transformation rule that states that Join is associative. This is because (i) the pattern of operators represented by expressions G0.2, G3.0, G4.0, G5.0 and G1.0, matches the pattern Join(Join(X,Y), Z) that is associated with the transformation rule (in particular, G0.2 matches the first join, G3.0 matches the second join, G4.0 matches X, G5.0 matches Y, and G1.0 matches Z), and (ii) because all of the operators in the pattern of operators represented by the expressions G0.2, G3.0, G4.0, G5.0 and G1.0 has a search distance associated therewith that is less than the maximum allowable search distance of 5.

In step 308, the transformation rule that states that Join is associative is applied to the foregoing expressions to generate a logically-equivalent pattern of operators within the MEMO structure. This is shown in Table 5 below.

TABLE 4

| Group | Expressions |
| --- | --- |
| G0 | 0: Join(G1, G3)→0, 1: Join(G8, G9)→0, 2: Join(G3, G1)→1 |
| G1 | 0: Select(G2)→0 |
| G2 | 0: Get(D)→0 |
| G3 | 0: Join(G4, G5)→0 |
| G4 | 0: Get(C)→0 |
| G5 | 0: Join(G6, G7)→0 |
| G6 | 0: Get(B)→0 |
| G7 | 0: Get(A)[0]→0 |
| G8 | 0: Join(G4, G6)→0 |
| G9 | 0: Join(G1, G7)→0 |

TABLE 5

| Group | Expressions |
| --- | --- |
| G0 | 0: Join(G1, G3)→0, 1: Join(G8, G9)→0, 2: Join(G3, G1)→1, 3: Join(G4, G10)→2 |
| G1 | 0: Select(G2)→0 |
| G2 | 0: Get(D)→0 |
| G3 | 0: Join(G4, G5)→0 |
| G4 | 0: Get(C)→0 |
| G5 | 0: Join(G6, G7)→0 |
| G6 | 0: Get(B)→0 |
| G7 | 0: Get(A)[0]→0 |
| G8 | 0: Join(G4, G6)→0 |
| G9 | 0: Join(G1, G7)→0 |
| G10 | 0: Join(G5, G1)→2 |

In particular, as shown in Table 5, the first join in the newly-generated pattern of operators becomes expression G0.3 and, since the second Join is not equivalent to any existing expression, it becomes the first expression G10.0 in a new group G10 in the MEMO structure.

In further accordance with this example, during step 310, a search distance is assigned to each operator in newly-added expressions G0.3 and G10.0. In this case, the search distance to be assigned is determined in accordance with a function $f(x)$, where x is the largest search distance currently assigned to an operator in expressions G0.2, G3.0, G4.0, G5.0 and G1.0 (i.e., 1), and where $f(x)=x+1$. In this case, application of function $f(x)$ results in a search distance of 2 being assigned to the operators in expressions G0.3 and G10.0, which is also shown above in Table 5.

Now assume that the maximum allowable search distance for exploration is 2 rather than 5. In this case, although expression G10.0 might appear to be eligible for application of the transformation rule that states that Join is commutative, it is not in fact eligible because it has a search distance associated therewith that is equal to the maximum allowable search distance. Thus, it can be seen that the application of the maximum allowable search distance constraint bounds exploration and prevents it from being exhaustive. If exploration were exhaustive, it can be shown that successive applications of the transformation rule that Join is commutative and the transformation rule that Join is associative to the logical operator trees stored within the MEMO data structure of Table 5 would eventually generate all equivalent Join trees, including "bushy" tree 500 discussed above in reference to FIG. 5.

As noted above, once no further patterns of operators that are eligible for the application of a transformation rule can be identified in the MEMO structure, the logical exploration of the plan search space is complete. At this point, one or more physical implementation alternatives for each of the logical representations of the query included in the MEMO structure can be obtained and a cost estimate can be associated with each physical implementation alternative. The physical implementation alternative that is associated with the lowest cost estimate may be selected as the desired execution plan.

Some further implementation details and alternatives associated with the method of flowchart 300 will now be described.

As discussed above in reference to step 306, a pattern of operators within the MEMO structure is considered eligible for the application of a transformation rule if (i) the pattern of operators matches a pattern associated with the particular transformation rule and (ii) a search distance associated with one or more of the operators in the pattern of operators is less than a maximum allowable search distance. Determining whether condition (ii) has been met may comprise examining the search distance currently associated with different ones or groups of operators within the pattern of operators. For example, in one embodiment, the search distance associated with every operator in the pattern of operators is examined to determine the greatest search distance associated with an operator. This greatest search distance is then compared to the maximum allowable search distance. If the greatest search distance is less than the maximum allowable search distance, then condition (ii) has been met. In an alternate embodiment, the search distance associated with only the root operator in the pattern of operators is compared to the maximum allowable search distance to determine if condition (ii) has been met. In a further alternate embodiment, the search distances associated with some or all of the operators in the pattern of operators are combined to generate a combined search distance and the combined search distance is compared to the maximum allowable search distance to determine if condition (ii) has been met. Still other approaches may be used.

In another embodiment, a pattern of operators within the MEMO data structure is considered eligible for the application of a transformation rule when only condition (i) of step 306 is met—i.e., if the pattern of operators matches a pattern associated with the particular transformation rule. In other words, search distance is not used to determine eligibility for the application of a transformation rule. In accordance with such an embodiment, after a transformation rule is applied to generate a new pattern of operators and search distances are assigned to those operators, then a test is performed to see if the newly-assigned search distances exceed the maximum allowable search distance. If the maximum allowable search distance is exceeded, then the new pattern of operators is not stored in or is removed from the MEMO data structure.

The maximum allowable search distance described in step 306 may be a constant value of the relational database system, a value that is selected or specified by a user of the system, or a value that is derived from a user's expression of how much budget they are willing to provide to the query optimization process. For example, a user may specify a function or graph that maps a cost to a maximum allowable search distance or that maps a cost to an optimization effort. The maximum allowable search distance may also be determined automatically based on a variety of factors, including but not limited to one or more factors associated with data in the relational database system or with the computing devices being used to implement the relational database system (e.g., the number of processors being used or the amount of memory available). Still other techniques may be used to specify, select, or otherwise obtain the maximum allowable search distance.

As discussed above in reference to step 308, the search distance assigned to each operator in a newly-added pattern of operators may be determined in accordance with a function $f(x)$, where x is a search distance associated with one or more of the operators in the original pattern of operators from which the newly-added pattern is derived. In the specific examples provided above, $f(x)=x+1$. However, this example is not intended to be limiting and a variety of other functions may be used.

Furthermore, different transformation rules may have different functions associated therewith. For example, a function $f(x)=x$ could be used for a transformation rule whose application is considered to be very helpful in identifying desirable execution plans. As can be seen, such a function would result in the generation of a new pattern of operators having search distances that are no greater than that associated with the pattern of operators from which the new pattern is derived. Thus, the application of such a transformation rule would not contribute to the bounding of the exploration process. Conversely, a function $f(x)=x+2$ could be used for a transformation rule whose application is considered to be less helpful. As can be seen, such a function would result in the generation of a new pattern of operators having search distances that are 2 greater than that associated with the pattern of operators from which the new pattern is derived. Thus, the application of such a transformation rule would tend to contribute more to the bounding of the exploration process than a transformation rule for which a function $f(x)=x+1$ is used.

Using increasing bounds on the maximum allowable search distance can provide a mechanism for conducting the distance-based logical exploration process in stages, wherein additional stages can be conducted until an execution plan that is determined to be "good enough" is reached. This concept will be further explained with respect to the method of flowchart 600. The method of flowchart 600 may be implemented by query optimizer 114 of FIG. 1. However, the method is not limited to that embodiment and may be implemented by other query optimizers or relational database systems.

Figure 6:
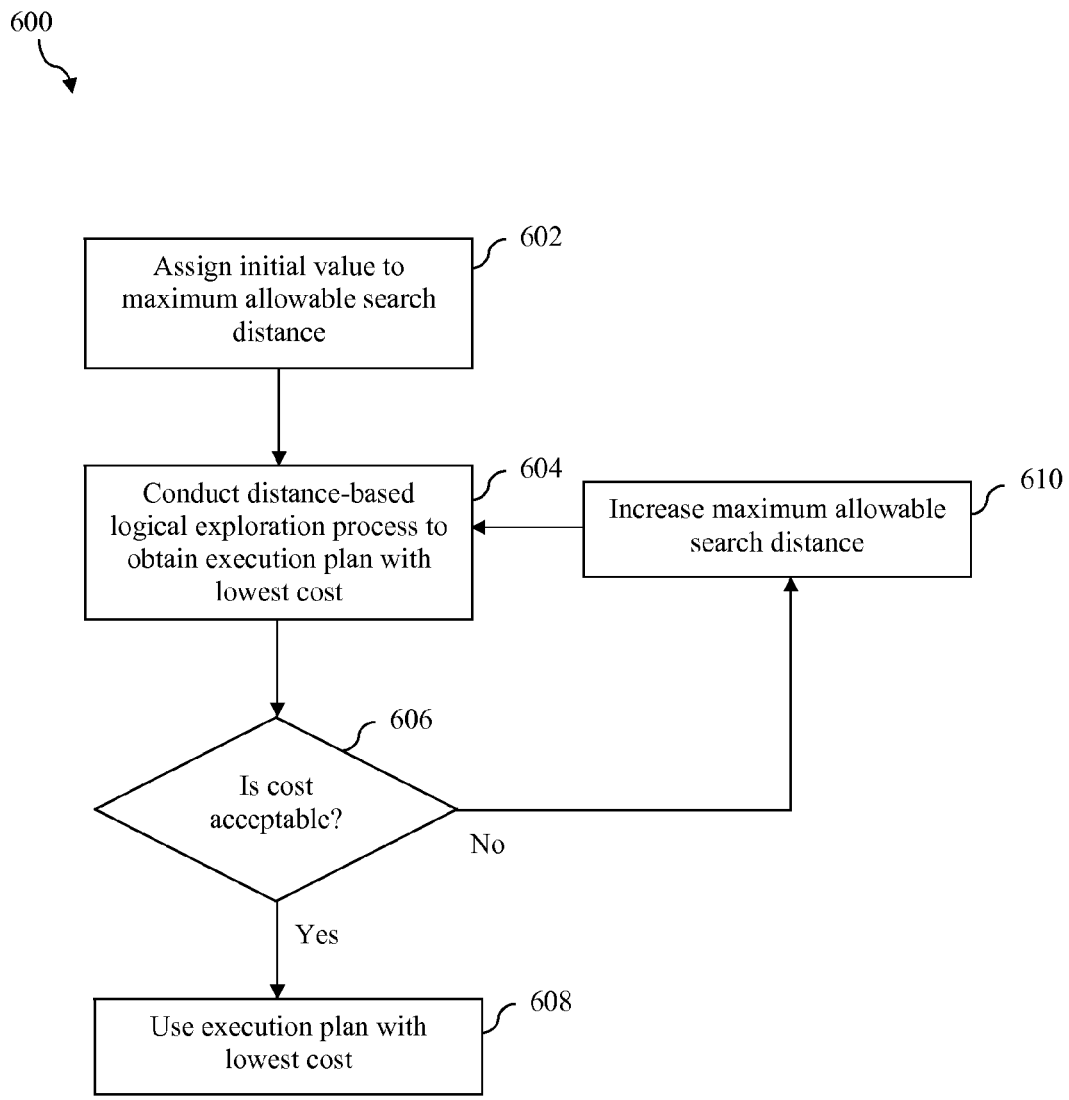
FIG. 6 depicts a flowchart of a method for performing a multi-stage distance-based logical exploration process for selecting a query execution plan in accordance with an embodiment.

As shown in FIG. 6, the method of flowchart 600 begins at step 602 in which an initial value is assigned to the maximum allowable search distance.

At step 604, a distance-based logical exploration process is conducted to obtain an execution plan with the lowest cost for servicing a query. For example, the process described above in flowchart 200 of FIG. 2 may be performed to obtain an execution plan with the lowest cost for servicing the query. The maximum allowable transformation distance described in flowchart 200 corresponds to the maximum allowable search distance of step 602. Such maximum allowable transformation/search distance bounds the exploration process as described above.

At decision step 606, it is determined whether the cost associated with the lowest cost execution plan identified during step 604 is acceptable. Determining whether the cost is acceptable may comprise, for example, determining if the cost is lower than some minimum cost. Different minimum costs may be used for different stages of the multi-stage exploration process.

If it is determined during decision step 606 that the cost associated with the lowest cost execution plan identified during step 604 is acceptable, then the lowest cost execution plan is selected as the execution plan for servicing the query as shown at step 608.

However, if it is determined during decision step 606 that the cost associated with the lowest cost execution plan identified during step 604 is not acceptable, then the maximum allowable search distance is increased at step 610. The distance-based logical exploration process is then continued in step 604 using the new maximum allowable search distance. This new stage of exploration will produce new execution plan possibilities and a new selection of the lowest cost alternative. At decision step 606, it is determined whether the cost of the newly-selected lowest cost alternative is acceptable. This process can be repeated until an execution plan with an acceptable cost is selected.

In an alternate embodiment, a time-out mechanism is added to the process depicted in flowchart 600 such that at a certain point in time and/or after a certain number of rule applications, if no acceptable lowest cost alternative has been found, the execution plan with the lowest cost will nevertheless be used. The time-out mechanism can be used to strike a balance between the overhead associated with finding the best execution plan and the overhead associated with servicing a query using a sub-optimal query plan.

In certain embodiments, increased bounds on transformation distance may be applied selectively to only those areas of the plan search space that are found to provide efficient plan execution strategies, thereby meriting further exploration. For example, if a particular group within a MEMO structure is determined to produce significantly greater costs savings relative to other groups within the same MEMO structure, an embodiment may increase the maximum allowable search distance for the particular group, thereby enabling greater logical exploration in that group.

Figure 7:
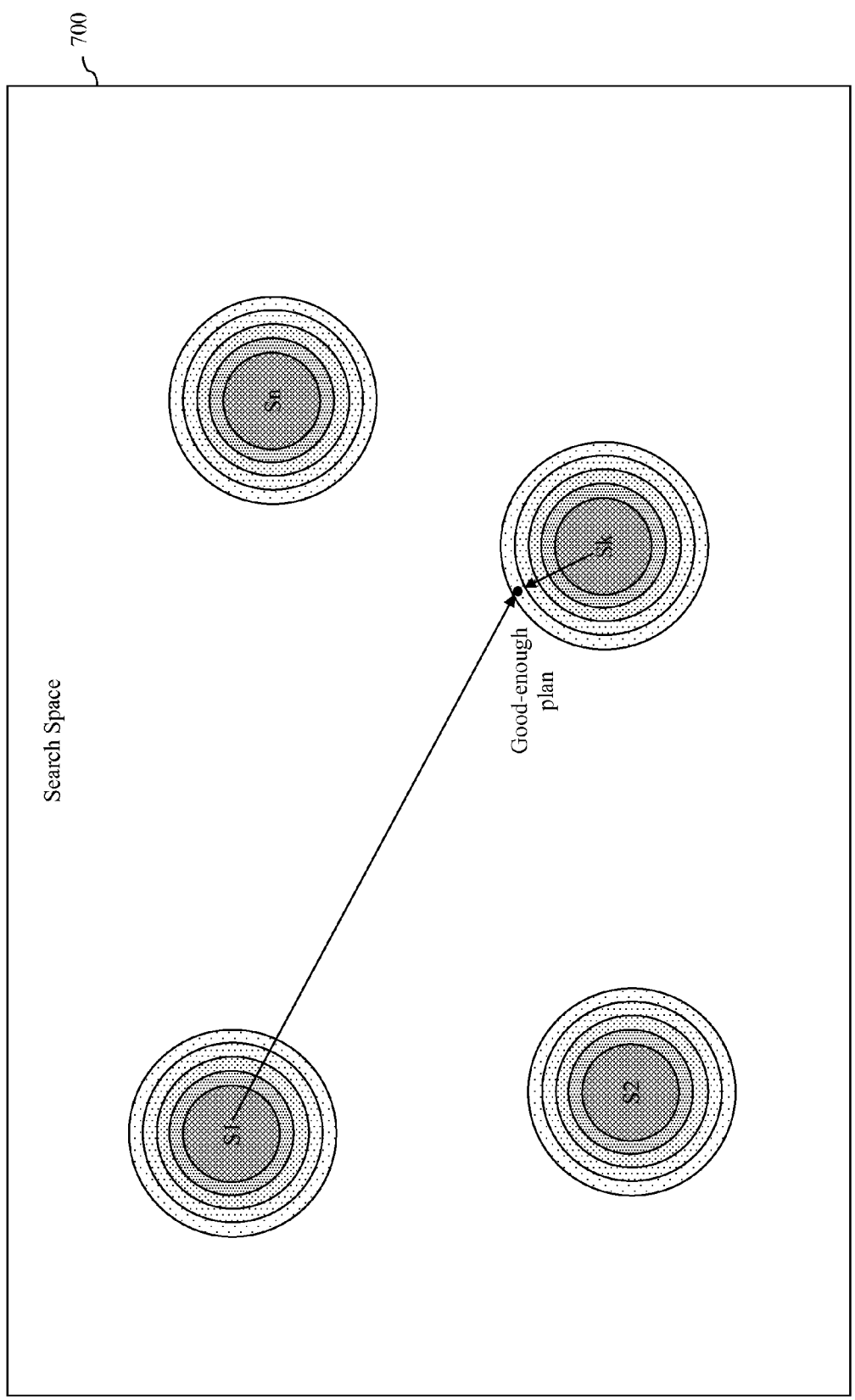
FIG. 7 illustrates a plan search space that is explored by a query optimizer to identify an execution plan that is deemed "good enough" for servicing a particular query in accordance with an embodiment.

FIG. 7 illustrates further features and advantages of the distance-based logical exploration approach described herein. In particular, FIG. 7 illustrates a plan search space 700 that is explored by a query optimizer to identify an execution plan that is deemed "good enough" for servicing a particular query. As shown in FIG. 7, a bounded exploration process is conducted around multiple starting points: S1, . . . Sn. As previously noted, each of the multiple starting points may be identified using global heuristics. However, other methods may be used. The search conducted around each starting point is bounded by a maximum allowable transformation distance as previously described. Each circle around a particular starting point represents a different exploration stage that is bounded by a different maximum allowable transformation distance. Further details concerning multi-stage exploration implementations are provided above in reference to FIG. 6.

A conventional approach to execution plan selection explores exhaustively from the starting point S1. The starting point S1 may end up being far away from any execution plan that is good enough to service the query, resulting in either excessive optimization effort or the generation of only sub-optimal plans. An embodiment of the distance-based logical exploration process described herein explores systematically from each of the multiple starting points S1, . . . Sn, gradually increasing the exploration distance (shaded circles) until an execution plan that is deemed "good enough" is found. The use of multiple starting points can provide a better coverage of the search space for a given investment in exploration (the total area of the shaded circles).

Yet another advantage of distance-based logical exploration compared to exhaustive exploration is that it allows a better interleaving of exploration with implementation. Implementation is the process that chooses a particular way to produce the results of an expression that provides particular physical properties (e.g., sorting on particular columns). For example, when implementing the expression Get(A), a selection may need to be made among multiple indexes defined on Table A. These indexes may have different sizes, and therefore different associated costs. Similarly, there are many methods of implementing a Join operation each having different costs, including hash joins, merge joins, and loop joins. A conventional approach exhaustively explores a group and its inputs before moving on to implementing any expression in the group. With distance-based exploration, exploration and implementation may be interleaved for different distances, using the results of implementation to inform subsequent exploration. Some examples of the foregoing will now be provided.

A query optimizer utilizing distance-based logical exploration can abandon "hopeless" groups. For example, suppose that the query optimizer has explored group 42 of a MEMO data structure up to a search distance of 5 and that the cheapest implementation that has been found to this point for a particular request on group G42 costs 200, while the best execution plan found to this point for the whole query has a total cost of 20. In this case, the query optimizer may decide to give up on exploring group G42 for any distance greater than 5.

A query optimizer using distance-based logical exploration can spend more effort on important groups. For example, suppose that the best execution plan for a search distance 5, which costs 20, includes an expression from a group G7 of a MEMO data structure that costs 18. The query optimizer may decide to explore group G7 to a greater distance, because improving it will have a big impact on the total cost.

Conversely, a query optimizer using distance-based logical exploration can spend less effort on unimportant groups. For example, suppose that the best execution plan for a search distance of 5, which costs 20, includes an expression from a group G13 of a MEMO data structure that costs 0.1. The query optimizer may decide not to explore group G13 any further, because improving it will not make much of a difference in terms of the total cost.

Still other features and advantages may be achieved utilizing the distance-based logical exploration techniques described herein. Thus, the foregoing description of features and advantages is not intended to be limiting.

IV. Example Processor-Based System Implementation

Figure 8:
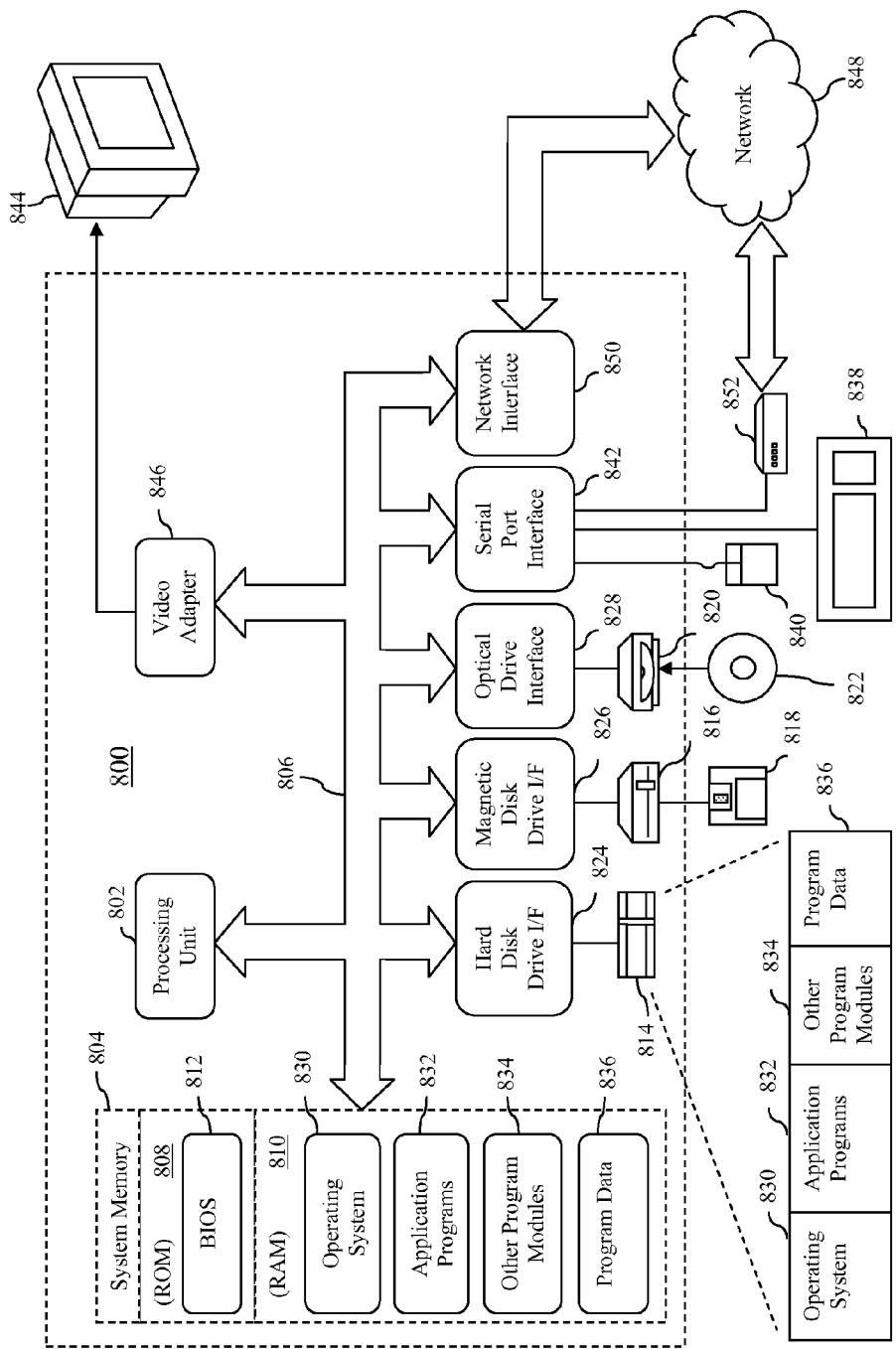
FIG. 8 is a block diagram of an example processor-based computer system that may be used to implement various embodiments.

FIG. 8 depicts an example processor-based computer system 800 that may be used to implement various embodiments described herein. For example, system 800 may be used to execute query-generating entity 102 and/or query processing system 104 as described above in reference to FIG. 1, as well as any components thereof. The description of system 800 provided herein is provided for purposes of illustration, and is not intended to be limiting. Embodiments may be implemented in further types of computer systems, as would be known to persons skilled in the relevant art(s).

As shown in FIG. 8, system 800 includes a processing unit 802, a system memory 804, and a bus 806 that couples various system components including system memory 804 to processing unit 802. Processing unit 802 may comprise one or more processors or processing cores. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

System 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, BLU-RAY™ disk or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 830, one or more application programs 832, other program modules 834, and program data 836. In accordance with various embodiments, the program modules may include computer program logic that is executable by processing unit 802 to perform any or all of the functions and features of query-generating entity 102 and/or query processing system 104 as described above in reference to FIG. 1, as well as any components thereof. The program modules may also include computer program logic that, when executed by processing unit 802, performs any of the steps or operations shown or described in reference to the flowcharts of FIGS. 2, 3, and 6.

A user may enter commands and information into system 800 through input devices such as a keyboard 838 and a pointing device 840. Other input devices (not shown) may include a microphone, joystick, game controller, scanner, or the like. In one embodiment, a touch screen is provided in conjunction with a display 844 to allow a user to provide user input via the application of a touch (as by a finger or stylus for example) to one or more points on the touch screen. These and other input devices are often connected to processing unit 802 through a serial port interface 842 that is coupled to bus 806, but may be connected by other interfaces, such as a parallel port, game port, or a universal serial bus (USB).

A display 844 is also connected to bus 806 via an interface, such as a video adapter 846. In addition to display 844, system 800 may include other peripheral output devices (not shown) such as speakers and printers.

System 800 is connected to a network 848 (e.g., a local area network or wide area network such as the Internet) through a network interface or adapter 850, a modem 852, or other suitable means for establishing communications over the network. Modem 852, which may be internal or external, is connected to bus 806 via serial port interface 842.

As used herein, the terms "computer program medium," "computer-readable medium," and "computer-readable storage medium" are used to generally refer to storage devices or storage structures such as the hard disk associated with hard disk drive 814, removable magnetic disk 818, removable optical disk 822, as well as other storage device or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850, serial port interface 842, or any other interface type. Such computer programs, when executed or loaded by an application, enable computer 800 to implement features of embodiments of the present invention discussed herein. Accordingly, such computer programs represent controllers of the computer 800.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, any of query-generating entity 102 and/or query processing system 104 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for generating an execution plan for a query in a relational database system, comprising:
    generating one or more initial logical representations of the query;
    performing a bounded exploration process around each of the one or more initial logical representations of the query, the performing of the exploration process around a particular initial logical representation of the query comprising applying transformation rules to generate one or more additional logical representations of the query that are logically equivalent to the particular initial logical representation of the query and that are within a maximum allowable transformation distance of the particular initial logical representation of the query, wherein each logical representation of the query comprises a plurality of operators and wherein generating the one or more additional logical representations of the query that are logically equivalent to the particular initial logical representation of the query comprises:
        assigning a search distance to each operator of a first logical representation of a query;
        applying a transformation rule to a pattern of operators within the plurality of operators of the first logical representation of the query to generate a second logical representation of the query in response to determining that (i) the pattern of operators matches a pattern associated with the applied transformation rule and (i) the search distance assigned to each operator in the pattern of operators, and that is a numerical value, is less than the maximum allowable transformation distance, the maximum allowable transformation distance being a numerical value that bounds a number of the transformation rules that can be applied to generate each one of the one or more additional logical representations of the query so that the number of transformation rules that is applied to generate each one of the one or more additional logical representations of the query is less than a total number of the transformation rules that can be applied;
    generating one or more execution plans for each initial logical representation of the query and each additional logical representation of the query and associating a cost with each of the generated execution plans; and
    selecting an execution plan having a lowest cost from among the generated execution plans.

2. The method of claim 1 wherein generating the one or more initial logical representations of the query comprises generating one or more initial logical operator trees; and
    wherein generating the one or more additional logical representations of the query comprises generating one or more additional logical operator trees.

3. The method of claim 1, wherein generating the one or more initial logical representations of the query comprises:
    applying one or more global heuristics to the query to generate the one or more initial logical representations of the query.

4. The method of claim 3, wherein applying the one or more global heuristics to the query comprises:
    applying one or more global heuristics selected or specified by a user of the relational database system.

5. The method of claim 1, further comprising:
    obtaining the maximum allowable transformation distance from a user;
    deriving the maximum allowable transformation distance from other information provided by a user; or
    determining the maximum allowable transformation distance based on one or more factors associated with data in the relational database system or with computing devices used to implement the relational database system.

6. The method of claim 1, further comprising:
    in response to determining that the cost associated with the selected execution plan is not acceptable:
        increasing the maximum allowable transformation distance; and
        continuing the performance of the exploration process around each of the one or more initial logical representations of the query using the increased maximum allowable transformation distance to generate one or more further logical representations of the query.

7. The method of claim 1, further comprising:
    in response to determining that an area of a plan search space explored by performing the exploration process a merits further exploration,
        increasing the maximum allowable transformation distance; and
        continuing the performance of the exploration process in the area of the plan search space using the increased maximum allowable transformation distance.

8. A method for generating an execution plan for a query in a relational database system, comprising:
    generating one or more initial logical representations of the query, each initial logical representation including a plurality of operators;
    performing a bounded exploration process comprising:
        (a) adding the operators of the one or more initial logical representations to a data structure;
        (b) identifying zero or more patterns of operators within the data structure that are eligible for the application of a transformation rule, a pattern of operators being eligible for the application of a transformation rule if (i) the pattern of operators matches a pattern associated with the transformation rule and (ii) a search distance associated with one or more of the operators in the pattern of operators, and that is a numerical value, is less than a maximum allowable search distance that is a numerical value corresponding to an upper bound of the search distance associated with the one or more of the operators in the pattern of operators to enable bounding of the exploration process;

(c) applying a transformation rule to each eligible pattern of operators identified in step (b) to generate a logically-equivalent pattern of operators within the data structure, thereby generating one or more additional logical representations of the query within the data structure;

(d) assigning a search distance to each operator within each logically-equivalent pattern of operators generated during step (c), the assigned search distance being a function of a search distance of one or more operators within the eligible pattern of operators to which the logically-equivalent pattern of operators corresponds; and (e) repeatedly performing steps (b), (c) and (d) until no further patterns of operators that are eligible for the application of a transformation rule can be identified within the data structure;

obtaining one or more physical implementation alternatives for each of the logical representations of the query included in the data structure; and selecting one of the physical implementation alternatives as the execution plan.

9. The method of claim 8, wherein generating the one or more initial logical representations of the query comprises:
applying one or more global heuristics to the query to generate the one or more initial logical representations of the query.

10. The method of claim 9, wherein applying the one or more global heuristics to the query comprises applying one or more global heuristics selected or specified by a user of the relational database system.

11. The method of claim 8, wherein step (a) comprises:
adding the operators of the initial logical representations of the query to a MEMO data structure.

12. The method of claim 8, wherein obtaining the one or more physical implementation alternatives for each of the logical representations of the query included in the data structure comprises:
converting one or more logical operators in the data structure to physical operators.

13. The method of claim 8, wherein selecting one of the physical implementation alternatives as the execution plan comprises:
calculating a cost associated with each physical implementation alternative obtained for each of the logical representations of the query included in the data structure; and
selecting a physical implementation alternative having the lowest cost associated therewith as the execution plan.

14. The method of claim 8, wherein step (b) further comprises:
determining that a search distance associated with one or more operators in a pattern of operators is less than the maximum allowable search distance, the determining including:

determining a greatest search distance associated with an operator in the pattern of logical operators; and
comparing the greatest search distance to the maximum allowable search distance.

15. The method of claim 8, wherein step (d) comprises:
identifying a function to be used to assign a search distance to each operator within a particular logically-equivalent pattern of operators based on the transformation rule that was applied to generate the particular logically-equivalent pattern of operators.

16. The method of claim 8, further comprising:
obtaining the maximum allowable search distance from a user;
deriving the maximum allowable search distance from other information provided by a user; or
determining the maximum allowable search distance based on one or more factors associated with data in the relational database system or with computing devices used to implement the relational database system.

17. The method of claim 8, further comprising:
in response to determining that a cost associated with the physical implementation alternative that was selected as the execution plan is not acceptable:
increasing the maximum allowable search distance; and
performing step (e) to generate one or more further logical representations of the query within the data structure.

18. A system, comprising:
one or more processors; and
a storage medium that stores computer program logic that is executable by the one or more processors, the computer program logic comprising:
first computer program logic that is programmed to cause the one or more processors to generate one or more initial logical representations of a query;
second computer program logic that is programmed to cause the one or more processors to perform a bounded exploration process around each of the one or more initial logical representations of the query, the performing of the exploration process around a particular initial logical representation of the query comprising applying transformation rules to generate one or more additional logical representations of the query that are logically equivalent to the particular initial logical representation of the query and that are within a maximum allowable transformation distance of the particular initial logical representation of the query, wherein each logical representation of the query comprises a plurality of operators and wherein generating the one or more additional logical representations of the query that are logically equivalent to the particular initial logical representation of the query comprises:
assigning a search distance to each operator of a first logical representation of the query;
applying a transformation rule to a pattern of operators within the plurality of operators of the first logical representation of the query to generate a second logical representation of the query in response to determining that (i) the pattern of operators matches a pattern associated with the applied transformation rule and (i) the search distance assigned to each operator in the pattern of operators, and that is a numerical value, is less than the maximum allowable transformation distance, the maximum allowable transformation distance being a numerical value that bounds a number of the transformation rules that can be applied to generate each of the one or more additional logical representations of the query so that the number of transformation rules that is applied to generate each one of the one or more additional logical representations of the query is less than a total number of the transformation rules that can be applied;

third computer program logic that is programmed to cause the one or more processors to generate one or more execution plans for each initial logical representation of the query and each additional logical representation of the query and associating a cost with each of the generated execution plans; and fourth computer program logic that is programmed to cause the one or more processors to select an execution plan having a lowest cost from among the generated execution plans.

19. The system of claim 18, wherein the first computer program logic is programmed to cause the one or more processors to generate the one or more initial logical representations of the query by applying one or more global heuristics to the query.

\* \* \* \* \*